United States Patent [19]
Traenckner et al.

[11] 3,856,644
[45] Dec. 24, 1974

[54] HIGHLY REACTIVE UNSATURATED POLYESTER RESIN COMPOSITIONS WHICH CONTAIN ACRYLAMIDE-METHYLOL-ETHERS AND CAN BE CURED BY UV-LIGHT

[75] Inventors: Hans-Joachim Traenckner, Krefeld-Fischeln; Hans Rudolph, Krefeld-Bockum; Hans Jürgen Rosenkranz, Krefeld; Karl Fuhr, Krefeld; Manfred Patheiger, Krefeld, all of Germany

[73] Assignee: Bayer Aktiengesellschaft, Leverkusen, Germany

[22] Filed: Oct. 12, 1973

[21] Appl. No.: 405,878

[30] Foreign Application Priority Data
Oct. 20, 1972   Germany............................ 2251469

[52] U.S. Cl... 204/159.15, 117/93.31, 117/155 UA, 204/159.19, 260/40 R, 260/77, 260/870
[51] Int. Cl. .......................... B01j 1/10, C08d 1/00
[58] Field of Search................. 204/159.15, 159.19; 260/870

[56] References Cited
UNITED STATES PATENTS

| | | | |
|---|---|---|---|
| 3,657,088 | 4/1972 | Heineebal...................... | 204/159.15 |
| 3,699,022 | 10/1972 | Behrensebal................... | 204/159.15 |
| 3,766,111 | 10/1973 | Metznerebal.................. | 204/159.15 |

*Primary Examiner*—Paul Lieberman
*Assistant Examiner*—Richard B. Turer
*Attorney, Agent, or Firm*—Connolly and Hutz

[57]   ABSTRACT

Highly reactive resin compositions that can be cured by UV-light and contain an unsaturated polyester with $\beta,\gamma$-ethylenically unsaturated ether groupings, one or more ethers selected from the alkyl, cycloalkyl, aralkyl and alkenyl ethers of N-methylolacrylamide and of N-methylolmethacrylamide, and a photoinitiator.

15 Claims, No Drawings

HIGHLY REACTIVE UNSATURATED POLYESTER RESIN COMPOSITIONS WHICH CONTAIN ACRYLAMIDE-METHYLOL-ETHERS AND CAN BE CURED BY UV-LIGHT

Coating compositions which contain unsaturated polyesters based on $\alpha,\beta$-unsaturated dicarboxylic acids and co-polymerisable monomers as well as photoinitiators can, as is known, be cured by the action of UV-light. In practice, formulations manufactured from these compositions are applied in layers of up to about 1 mm onto timbers or other substrates and cured in a few minutes by passing in front of suitable sources of UV-light. Such systems are described, for example, in DT-AS (German Published Specification) 1,694,149. The inhibiting influence of atmospheric oxygen can firstly be eliminated by adding to the lacquer formulation small amounts of paraffin which during the curing process float to the surface as a thin sealing layer. Secondly, polyesters, dissolved in styrene, which through containing certain ether groupings are no longer subject to the inhibiting influence of atmospheric oxygen, also dry non-tacky on curing by means of UV-light. Such systems cure, within the irradiation time customary in practice, to give very glossy coatings without it being necessary to remove a delustering paraffin film by rubbing down. Solutions of polyesters of this nature are also described in DT-AS (German Published Specification) 1,649,149 and in German Patent Application No. P 21 13 998.0.

As already mentioned, mixtures, which cure in UV-light, of polyesters manufactured from $\alpha,\beta$-unsaturated dicarboxylic acids and polyfunctional alcohols, mixed with styrene, find a broad use in the coating of timbers and other materials customary in the lacquering of furniture. The binders employed in the formulations used, and the available light sources, demand curing times of 0.5-2.0 minutes.

An acceleration of this drying process by increasing the reactivity of the UV-light-curing resin compositions is thoroughly desirable since the cycle times in the timber industry and furniture industry could be shortened further. However, a greater speed of drying of UV-light-curing systems would also open up numerous new fields of use, such as, for example, the coating of printed products or the use as binders for UV-light-curing printing inks. In these fields of use, curing must be complete in a few seconds, because of the high speed of modern printing machines.

Hence investigations were directed towards developing UV-light-curing systems which cure within a substantially shorter time, without inhibition by atmospheric oxygen.

In the past there has been no lack of attempts to develop such resin systems. For example, DT-OS (German Published Specification) 1,571,921 and DT-OS (German Published Specification) 1,694,930 describe binders which can be employed for the manufacture of UV-light-curing printing inks. These systems are unsuitable for use as binders for lacquers which can be applied as a thicker layer and can be cured within the short time available to give coatings which meet practical requirements. In layers of more than a few $\mu$, the films which can be manufactured with such systems are only of a gel-like consistency and frequently do not even meet the practical requirements for abrasion resistance which printing inks have to meet.

Surprisingly, it has now been found that mixtures of certain unsaturated polyesters with alkyl ethers and/or cycloalkyl ethers and/or aralkyl ethers and/or alkenyl ethers of N-methylolacrylamide and/or N-methylolmethacrylamide as well as photoinitiators give UV-light-curing coating compositions which cure within a few seconds to give firm, non-tacky coatings if they are irradiated with UV-light such as is provided, for example, by the mercury high pressure lamps customary in practice.

Accordingly, the invention relates to UV-light-curable resin compositions which contain a) 10-90 percent by weight of a polyester based on $\alpha,\beta$-ethylenically unsaturated dicarboxylic acids containing $\beta,\gamma$-ethylenically unsaturated ether groupings, b) 90-10 percent by weight of an alkyl ether and/or cycloalkyl ether and/or aralkyl ether and/or alkenyl ether of N-methylolacrylamide and/or N-methylolmethacrylamide and c) 0.3-10 percent by weight referred to the sum of component a) and component b) of a photoinitiator, preferably from the class of the halogenoalkylated benzophenones, and optionally one or more further resin components compatible therewith.

A further subject of the invention is the use of such compositions for the manufacture of coatings, printing inks and surface-filling compositions.

Unsaturated polyesters in the sense of the invention are condensates which are built up of $\alpha,\beta$-ethylenically unsaturated dicarboxylic acids, such as maleic acid, fumaric acid or itaconic acid, and monofunctional and/or bifunctional hydroxy compounds which contain one or more $\beta,\gamma$-ethylenically unsaturated ether groupings in the molecule, for example trimethylolpropane monoallyl and/or diallyl ethers, glycerine monoallyl and/or diallyl ethers or pentaerythritol monoallyl, diallyl or triallyl ethers. The dicarboxylic acid constituent of the condensates employed according to the invention can be formed, to the extent of up to 50 mol percent, of the customary saturated aliphatic, cycloaliphatic and/or aromatically unsaturated dicarboxylic acids customary in polyester chemistry. Examples of suitable acids are phthalic acid, terephthalic acid, isophthalic acid, tetrahydrophthalic acid, hexahydrophthalic acid, malonic acid, succinic acid, glutaric acid, adipic acid, norbornenedicarboxylic acid and hexachloronorbornenedicarboxylic acid. Furthermore it is possible to use conjointly all customary polyfunctional alkanols, such as ethylene glycol, propanediol-1,2 and -1,3, butanediol-1,2 and -1,4, glycerine, trimethylolpropane, pentaerythritol, neopentyl glycol, cyclohexanediol-1,2, 2,2-bis-(p-hydroxycyclohexylpropane) and 1,4-bismethylolcyclohexane. However, the conjoint use of ether glycols, such as diethylene glycol, triethylene glycol and tetraethylene glycol, and of the monoalkyl ethers of these glycols, in amounts of 0 to 70 mol percent, relative to the hydroxy components employed, is particularly preferred.

The polyesters described in the preceding text can be manufactured according to the customary processes of melt condensation or azeotropic esterification, and in the latter process the catalysts customary for this purpose and known to those skilled in the art can be employed. It may be advisable, from case to case, also to use, in the manufacture of the polyesters, polymerisation inhibitors such as hydroquinone, benzoquinone, 3-methyl-pyrocatechol or metal compounds, in amounts of 0.001 to 0.1 percent by weight which are customary in practice. The molecular weights of the polyesters are generally between 300 and 4,000, preferably between 500 and 2,000.

Alkyl ethers and/or cycloalkyl ethers and/or aralkyl ethers and/or alkenyl ethers of N-methylolacrylamide and/or N-methylolmethacrylamide which can be employed in the UV-light-curing compositions according to the invention are, for example, compounds of the general formula

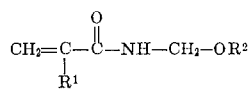

wherein
$R^1$ can be H or $CH_3$ and
$R^2$ can be alkyl ($C_1$–$C_{12}$), cycloalkyl ($C_3$–$C_{12}$), alkenyl ($C_2$–$C_8$) and aralkyl ($C_7$–$C_8$).

These compounds are easily accessible according to known processes. For example, they can be obtained according to DT-AS (German Published Specification) 1,002,326 from N-methylolacrylamide or N-methylolmethacrylamide and the desired alcohol by reaction in the presence of acid catalysts or, as described in DT-AS (German Published Specification) 1,281,438, by direct reaction of paraformaldehyde and acrylamide or methacrylamide with an alcohol, again in the presence of an acid catalyst. Examples of suitable compounds are here: methoxymethylacrylamide, methoxymethylmethacrylamide, butoxymethylacrylamide and butoxymethylmethacrylamide, propoxymethylacrylamide and propoxymethylmethacrylamide, ethoxymethylacrylamide and ethoxymethylmethacrylamide, pentanoxymethylacrylamide and pentanoxymethylmethacrylamide, hexanoxymethylacrylamide and hexanoxymethylmethacrylamide, cyclohexanoxymethylacrylamide and cyclohexanoxymethylmethacrylamide, benzyloxyacrylamide and benzyloxymethacrylamide and, in a particularly preferred embodiment of the invention, the allyl ether of N-methylolacrylamide, the allyl ether of N-methylolmethacrylamide and the corresponding methallyl compounds.

These vinyl monomers are distinguished by an extremely low volatility in addition to a high reactivity. This leads to the compositions according to the invention being odourless and showing no tendency to thickening up even on prolonged dwell on applicator rollers.

Suitable photoinitiators which can be used in the UV-light-curing resin compositions are benzoin and its derivatives, for example according to DT-OS (German Published Specifications) 1,769,168, 1,769,853, 1,769,854, 1,804,297, 1,807,301 and 1,919,678 and DT-AS (German Published Specification) 1,694,149. However, phenacyl chloride, phenacyl bromide, desyl chloride ($\alpha$-chloro-$\alpha$-phenylacetophenone) and other photoinitiators containing halogen can also be used.

Preferred photoinitiators in the sense of the invention are halogenomethylated benzophenones of the general formula

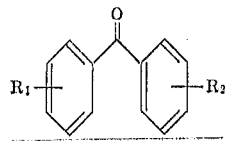

wherein $R_1$ denotes $CH_2$—X, $CH$—$X_2$ or $CX_3$,
$R_2$ denotes H, $CH_3$, $CH_2$—X, $CH$—$X_2$ or $CX_3$ and
X denotes chlorine, bromine or iodine.

Such compounds are described in DT-OS (German Published Specification) 1,949,010. Mixtures of the compounds claimed therein can also be used.

The UV-light-curing resin compositions according to the invention are distinguished by a surprisingly high reactivity on curing under the mercury high pressure lamps which are customary in practice. The coatings produced with these compositions possess, even in thicker layers, the good mechanical properties required for lacquers. As binders for UV-light-curing printing inks they are distinguished by good abrasion resistance already immediately after the curing process.

The resin compositions can contain additives, depending on the requirements of the end use. For example, the customary fillers, such as silica, talc, chalk, gypsum and baryte can be employed without hindering the photo-reaction. If the compositions are intended to be used as binders for UV-light-curing printing inks it is possible to employ the pigments customary for this purpose, such as organic pigments of the azo series (see Ullmanns Enzyklopädie der techn. Chemie (Ullmanns Encyclopaedia of Industrial Chemistry), Volume 13, page 809); anthraquinone dyestuffs (see Ullmanns Enzyklopadie der techn. Chemie (Ullmanns Encyclopaedia of Industrial Chemistry), Volume 13, 1952, page 693) and quinacridone pigments, inorganic pigments, such as titanium dioxide, iron pigments, cadmium pigments, chromium pigments and zinc pigments, and also carbon black, in the amounts customary in practice.

UV absorbers, further stabilisers and organic peroxides can be used conjointly, if the application demands it.

However, a combination with other resins, for example resins listed in the Lacquer Raw Material Tables of Dr. Erich Karsten (4th edition, 1967, Curt R. Vincentz-Verlag, Hannover) is also possible. Where the resins are miscible and the added resins do not retard the curing process through the presence of inhibiting groups, for example phenolic OH groups, such additives, which can amount to as much as 50 percent by weight of the mixture, can be employed to optimise the UV-light-curing resin compositions.

Depending on the viscosity of the resin compositions claimed which, as can readily be seen, depends above all on the molecular weight of the polyester and the mixing ratio of the components, various application processes can be employed. For example, application can be effected by the use of rollers, by casting, spraying, trowelling or printing, or by means of a brush. Used in this way, the UV-light-curing resin compositions according to the invention are suitable for coating or printing paper, wood, cardboard, leather, plastics, textiles, metal, glass or other materials on which a firm coating is to be produced within a brief period.

The examples which follow are intended further to explain the invention; the parts listed therein are parts by weight.

EXAMPLE 1

2,552 parts of fumaric acid and 451 parts of 1,2-propylene glycol are slowly heated to 150°C whilst passing nitrogen over the mixture. At this temperature, 1,441 parts of diethylene glycol, 941 parts of trimethylolpropane diallyl ether, 428 parts of diethylene glycol monobutyl ether and 0.34 part of hydroquinone are added. The internal temperature is raised to 180°C at the rate of 10°C per hour and the condensation is carried out until 98 percent of the theoretical amount of water have been liberated.

Measurements of the viscosity and acid number also permit a good check of the state of the esterification. The condensation is best stopped at a viscosity of 19.5 seconds in a DIN-4 cup (50 percent strength in styrene) or at an acid number of 30 (OH number about 80).

100 parts of the unsaturated polyester resin were mixed with 20 parts of N-methylolacrylamide allyl ether and 3 parts of p-benzoylbenzal chloride or 3 parts of benzoin isopropyl ether were added. The viscosities of the two mixtures were 160 poise. The resin compositions were applied as a uniform thin layer to white cardboard sheets by means of a rubber roller. Thereafter they were cured in a continuous flow process under four mercury high pressure lamps (Philips HTQ, lamp spacing 25 cm) at a distance of 5 cm, until completely dry. The preparations with p-benzoylbenzal chloride required 5 seconds and those with benzoin isopropyl ether 11 seconds. After this period of irradiation the coatings were hard, completely non-tacky and very glossy. The layer thickness was 3–5$\mu$ if the amount applied was 5–8 g/m². If the content of photoinitiator is increased to 5.0 percent in each case, drying takes place in 2 seconds in the case of p-benzoylbenzal chloride and in 5 seconds in the case of benzoin isopropyl ether.

EXAMPLE 2

An unsaturated polyester was manufactured from 2,550 parts of fumaric acid, 459 parts of propylene glycol, 1,470 parts of diethylene glycol, 989 parts of trimethylolpropane diallyl ether, 463 parts of diethylene glycol monobutyl ether and 0.34 part of hydroquinone in accordance with Example 1. The condensation was stopped at 15.0 seconds (DIN-4 cup, 50 percent strength in styrene) and 85 parts of the isolated polyester were mixed with 15 parts of N-methylolacrylamide allyl ether, constituting mixture A, or with 15 parts of N-methoxymethylmethacrylamide, constituting mixture B.

Both mixtures were mixed with 2.50 parts of p-benzoylbenzal chloride or with 2.50 parts of benzoin isopropyl ether. The viscosity of the mixtures was again approx. 130 poise. The resin compositions were applied to white cardboard, and irradiated, as described under Example 1. The following results were obtained.

Table

| Photoinitiator | Mixture | Drying time [sec] |
|---|---|---|
| p-Benzoylbenzal chloride, 2.5% | A | 5 |
| | B | 6 |
| Benzoin isopropyl ether, 2.5% | A | 11 |
| | B | 13 |

COMPARISON EXAMPLE 1

70 parts of the polyester resin described under Example 1 are mixed with 30 parts of styrene. Samples of this resin composition are mixed with 2.5 percent of benzoin isopropyl ether or with 2.5 percent of p-benzoylbenzal chloride. The composition was applied to white cardboard sheets, and irradiated, as described under Example 1. The mixture with benzoin isopropyl ether cures after 13 seconds and the mixture with p-benzoylbenzal chloride after 23 seconds, to give completely non-tacky and hard coatings.

EXAMPLE 3

100 parts of the polyester resin manufactured under Example 2 were mixed with 50 parts of N-methylolacrylamide allyl ether and with 3.75 parts of p-benzoylbenzal chloride or benzoin isopropyl ether. The viscosity of the mixture was about 25 poise. The resin compositions were applied, by means of a knife, in uniform thin layers onto white cardboard. They were subsequently irradiated, in a continuous flow process, under 4 mercury high pressure lamps (Philips HTQ-4, lamp spacing 25 cm) at a distance of 5 cm, until completely dry. The preparation with p-benzoylbenzal chloride required 8 seconds and the preparation with benzoin isopropyl ether required 16 seconds. After this irradiation time the coatings were hard, completely non-tacky and very glossy. The layer thickness was 20$\mu$ if the amount applied was 25 g/m².

EXAMPLE 4

Resin compositions manufactured according to Example 3 were applied to glass plates by means of a film spreader (500$\mu$ gap width). Thereafter they were cured under the radiation from 4 mercury high pressure lamps (Philips HTQ, lamp spacing 25 cm) at a distance of 7 cm. For complete drying, 20 seconds were required in the case of p-benzoylbenzal chloride and 40 seconds in the case of benzoin isopropyl ether. After this irradiation time the coatings were hard, completely non-tacky and very glossy. The layer thickness was 320$\mu$ if the amount applied was 400 g/m².

EXAMPLE 5

100 parts of the unsaturated polyester resin according to Example 1 were mixed with 50 parts of N-methylolacrylamide allyl ether and 3.75 parts of p-benzoylbenzal chloride or benzoin isopropyl ether. The viscosities of the mixtures were approx. 25 poise. In order to obtain a surface filler which could be applied by roller, 80 parts of talc and 40 parts of gypsum are added. The composition thus obtained is applied by means of a roller applicator machine for surface fillers, onto chipboards at the rate of 100 g/m². Thereafter it was cured in a continuous flow process under the radiation from four mercury high pressure lamps (Philips HTQ-4; lamp spacing 25 cm) at a distance of 7 cm. This required 20 seconds in the case of p-benzoylbenzal chloride and 30 seconds in the case of benzoin isopropyl ether. After this irradiation time the coatings were hard, could be rubbed down and displayed good adhesion to subsequent finishing lacquers.

What we claim is:

1. A resin composition that can be cured by ultraviolet light, which composition contains (a) 10–90 percent by weight of an unsaturated polyester based on one or more $\alpha,\beta$-unsaturated dicarboxylic acids and at least one polyol wherein said polyol contains an allyl ether of a polyfunctional alcohol, said polyfunctional alcohol being at least trifunctional, (b) 90–10 percent by weight of one or more ethers selected from the alkyl, cycloalkyl, aralkyl and alkenyl ethers of N-methylolacrylamide and of N-methylolmethacrylamide, and (c) 10–0.3 percent by weight referred to the sum of component a) and component b) of a photoinitiator.

2. A composition according to claim 1, in which the unsaturated polyester (a) is based on maleic acid, fumaric acid or itaconic acid.

3. A composition according to claim 1, in which the β,γ-ethylenically unsaturated ether groupings are derived from trimethylolpropane monoallyl or diallyl ether, glycerine monoallyl or diallyl ether or pentaerythritol monoallyl, diallyl or triallyl ether.

4. A composition according to claim 1, in which up to 50 mole percent of the dicarboxylic acid content of the unsaturated polyester (a) is derived from one or more saturated aliphatic, cycloaliphatic and aromatic dicarboxylic acids.

5. A composition according to claim 4, in which the saturated dicarboxylic acid is one that is hereinbefore mentioned.

6. A composition according to claim 1, in which the unsaturated polyester (a) contains up to 70 mole percent, relative to the hydroxy component employed, of an ether glycol or a monoalkyl ether thereof.

7. A composition according to claim 1, in which the molecular weight of the unsaturated polyester (a) is between 300 and 4,000.

8. A composition according to claim 1, in which the ether (b) is of the general formula

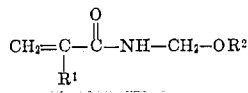

in which
R$^1$ is H or CH$_3$, and
R$^2$ is C$_1$–C$_{12}$–alkyl, C$_3$–C$_{12}$–cycloalkyl, C$_2$–C$_8$–alkenyl or C$_7$– or C$_8$–aralkyl.

9. A composition according to claim 8 in which the ether (b) is selected from the allyl and methallyl ethers of N-methylolacrylamide and of N-methylolmethacrylamide.

10. A composition according to claim 1, in which the photoinitiator (c) is a halogenoalkylated benzophenone.

11. A composition according to claim 10, in which the photoinitiator (c) is of the general formula

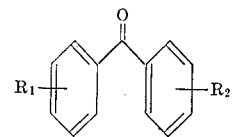

in which
R$_1$ is —CH$_2$X, —CHX$_2$ or —CX$_3$,
R$_2$ is H, —CH$_3$, —CH$_2$X, —CHX$_2$ or —CX$_3$, and X is Cl, Br or I.

12. A composition of claim 1 which contains at least one member selected from the group consisting of fillers and pigments.

13. A printing ink made from the composition of claim 1.

14. A method of producing a cured resin, which comprises exposing the composition of claim 1 to ultraviolet light.

15. A cured resin produced by the method of claim 14.

* * * * *